United States Patent

Rodriguez

(10) Patent No.: US 8,863,573 B2
(45) Date of Patent: Oct. 21, 2014

(54) MULTIPLE SPEED DYNAMIC SHAFT BALANCING

(75) Inventor: Rolando V. Rodriguez, Metamora, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 238 days.

(21) Appl. No.: 13/478,452

(22) Filed: May 23, 2012

(65) Prior Publication Data

US 2013/0312515 A1 Nov. 28, 2013

(51) Int. Cl.
*G01M 1/16* (2006.01)
*G01M 1/22* (2006.01)

(52) U.S. Cl.
USPC ............................................. 73/462; 73/460

(58) Field of Classification Search
CPC ......... G01M 1/22; G01M 1/02; G01M 1/225; G01M 1/045; G01M 1/24; G01M 1/04; G01M 1/32; G01M 1/16; G01M 1/20; G01M 1/326
USPC ........................................... 73/462, 460, 468
See application file for complete search history.

(56) References Cited

U.S. PATENT DOCUMENTS

| | | | | |
|---|---|---|---|---|
| 4,098,127 A * | 7/1978 | Shiga et al. | | 73/462 |
| 4,453,407 A * | 6/1984 | Sato et al. | | 73/462 |
| 5,627,762 A * | 5/1997 | Cameron et al. | | 700/279 |
| 6,622,105 B2 * | 9/2003 | Determan | | 702/105 |
| 6,647,790 B2 * | 11/2003 | Stalsberg | | 73/570 |
| 6,789,422 B1 * | 9/2004 | Ward, Jr. | | 73/462 |
| 7,066,025 B1 * | 6/2006 | Corbin | | 73/462 |
| 7,640,802 B2 * | 1/2010 | King et al. | | 73/489 |
| 8,051,709 B2 * | 11/2011 | Allen et al. | | 73/460 |
| 8,056,410 B2 * | 11/2011 | Sanchez et al. | | 73/455 |
| 8,056,411 B2 * | 11/2011 | Rodriguez | | 73/462 |
| 8,522,423 B2 * | 9/2013 | Rogalla et al. | | 29/714 |
| 2013/0174658 A1 * | 7/2013 | Kataoka et al. | | 73/462 |

* cited by examiner

*Primary Examiner* — Helen Kwok

(57) ABSTRACT

A method of dynamically balancing a shaft for multiple rotational speeds comprising: rotating the shaft in the balancer at a first rotational speed while measuring a first force and a first angle of a first shaft imbalance measurement; rotating the shaft at a predetermined second rotational speed while measuring a second force and a second angle of a second shaft imbalance measurement; comparing the first shaft imbalance measurement to a first predetermined imbalance specification and comparing the second shaft imbalance measurement to a second predetermined imbalance specification; if the first shaft imbalance does not meet the first predetermined imbalance specification or the second shaft imbalance does not meet the second predetermined imbalance specification, then calculating a composite correction based on the first and second shaft imbalance measurements; and applying a first weight to the shaft at a correction first angle based on the calculated composite correction.

12 Claims, 3 Drawing Sheets

MULTIPLE SPEED DYNAMIC SHAFT BALANCING

BACKGROUND OF INVENTION

The present invention relates generally to dynamic balancing of rotating shafts.

Rotating shafts may be balanced to reduce noise and vibration created when the shafts are out of balance. For example, a prop-shaft (drive shaft) in an automotive vehicle may be balanced in order to reduce the noise and vibration produced during vehicle operation, making the vehicle environment more pleasant for vehicle occupants.

Typically, detecting dynamic shaft imbalance is accomplished at a single rotational speed, with the shaft having to meet an imbalance specification at that speed. Occasionally, after the detection at a first speed, the shaft may undergo an audit at a higher speed to meet a second imbalance specification for that higher speed. However, when the shaft is corrected for any imbalance at the higher speed, the imbalance may be deteriorated at the lower speed (where the imbalance at the lower speed had been previously corrected). For an automotive vehicle, it may be desirable to provide the lowest possible imbalance at more than one rotational speed.

For example, an automotive vehicle may exhibit a body cavity resonance that is excited by a rotating driveshaft at a first rotational speed. It may be highly desirable to reduce the imbalance at this first rotational speed to reduce vehicle interior noise that may bother occupants. For this same automotive vehicle, it may also be highly desirable to minimize the driveshaft imbalance forces imparted to the vehicle power plant at a second rotational speed, which may be a speed that occurs while cruising on a highway. Minimizing the imbalance forces at this second rotational speed may help, for example, to maximize the durability of a transmission case structure.

SUMMARY OF INVENTION

An embodiment contemplates a method of dynamically balancing a shaft for multiple rotational speeds, the method comprising the steps of: loading the shaft into a balancer; rotating the shaft in the balancer at a predetermined first rotational speed while measuring, with a sensor, a first force and a first angle of a first shaft imbalance measurement; rotating the shaft in the balancer at a predetermined second rotational speed, different from the first rotational speed, while measuring, with the sensor, a second force and a second angle of a second shaft imbalance measurement; comparing the first shaft imbalance measurement to a first predetermined imbalance specification and comparing the second shaft imbalance measurement to a second predetermined imbalance specification; if the first shaft imbalance does not meet the first predetermined imbalance specification or the second shaft imbalance does not meet the second predetermined imbalance specification, then calculating a composite correction based on the first and second shaft imbalance measurements; and applying a first amount of weight to the shaft at a first correction angle based on the calculated composite correction.

An advantage of an embodiment is that an improved dynamic shaft balancing is achieved by iteratively calculating and applying composite corrections for multiple rotational speeds to optimally minimize dynamic shaft imbalance at multiple rotational speeds. Such multiple speed dynamic shaft balancing employed with a drive shaft of an automotive vehicle may minimize vehicle interior noise, in order to satisfy vehicle occupants, while also minimizing imbalance forces imparted to a vehicle power plant, in order to maximize the durability of vehicle power plant components. Also, improving the dynamic shaft balancing for multiple speeds may also minimize the need to employ more costly materials and fabrication methods for the shaft to meet the dynamic balancing needs of the shaft.

DETAILED DESCRIPTION

Figure 1:
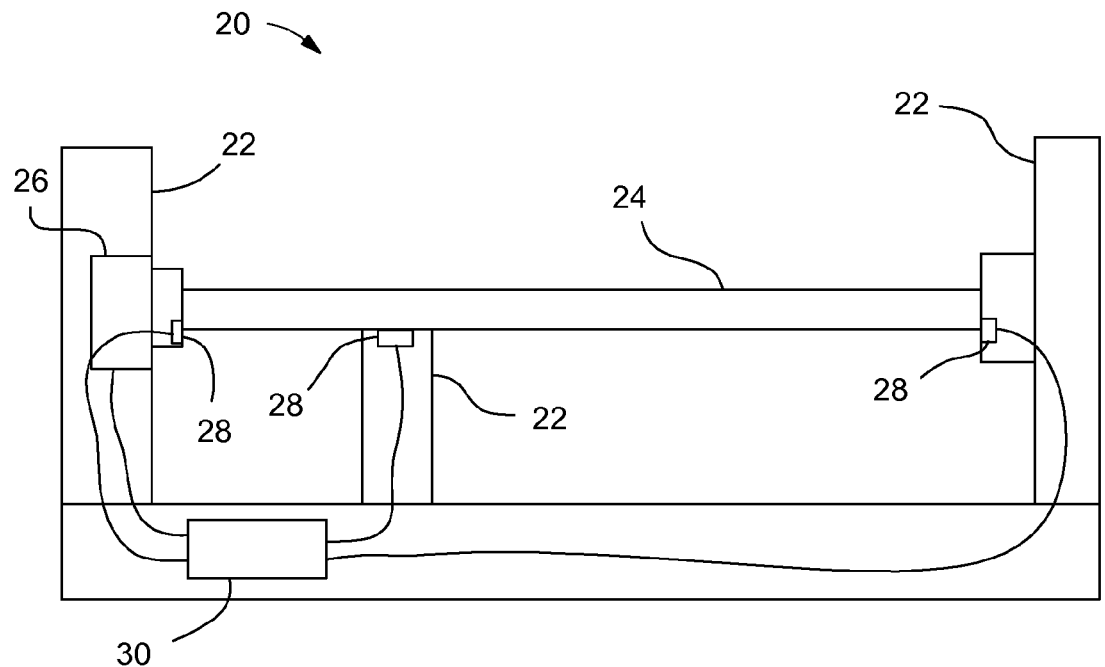
FIG. 1 is a schematic view of a dynamic shaft balancing machine with a shaft mounted therein.

Referring to FIG. 1, a dynamic shaft balancing machine (balancer) 20 is shown. The balancer 20 includes supports 22 for retaining a shaft 24 to be tested. A pair of the supports 22 is at the end of the shaft 24, while others may be mid-shaft for multiple piece shaft configurations. A motor 26 rotationally drives the end supports 22. The balancer 20 also includes sensors 28 that detect the out of balance of the shaft 24. The sensors 28 may be load cells that measure force and angular direction of the force as the shaft 24 is being rotated. The sensors 28 may be located adjacent to each end of the shaft 24 and at mid-shaft support locations. The balancer hardware may be conventional and so will not be discussed in more detail herein.

The balancer 20 also includes a controller 30 that controls the motor 26 to drive the end supports 22 at the desired rotational speeds at which the shaft will be tested and also receives inputs from the sensors 28 to record the out of balance measurements during testing. The controller 30 may be made up of various combinations of hardware and software as is known to those skilled in the art. The controller 30 employs an algorithm to determine shaft imbalance and corrections needed to bring the particular shaft 24 being tested into compliance with the balance requirements for that shaft. The geometry of the particular shaft 24 may be input into the controller 30 and combined with input from the sensors 28 when calculating the imbalance for that particular shaft 24. The geometry may include, for example, diameter of the shaft, distance between sensors 28 and the location where correction weights (discussed below) may be added.

Figure 2:
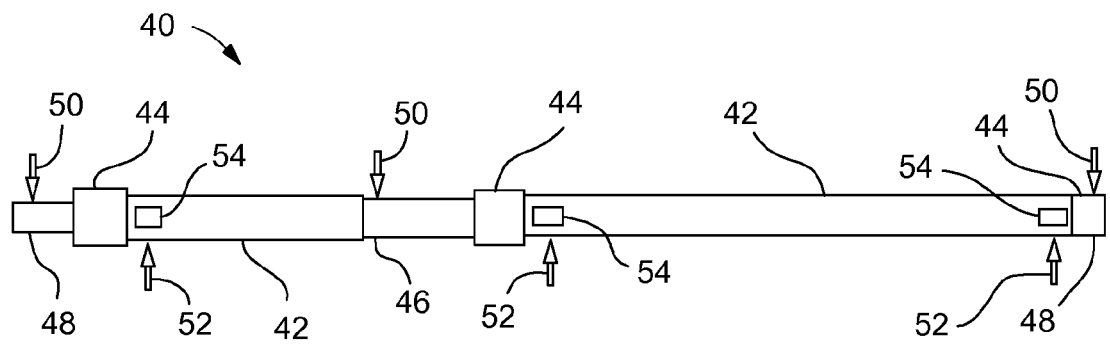
FIG. 2 is a schematic view of a shaft to be balanced.

FIG. 2 illustrates an example of a shaft 40 to be balanced. The shaft 40 may include multiple sections 42 connected by joints 44, such as, for example, U-joints, and may include mid-shaft support locations 46, in addition to end of shaft support locations 48. The shaft 40 illustrated in FIG. 2, may be, for example, a drive shaft for a rear drive pick-up truck or sport utility vehicle. Examples of possible locations for sensors that measure the force and angular direction of the force are noted by arrows labeled with element numbers 50. Examples of possible locations where weights 54 may be added to correct for imbalances are noted by arrows with element numbers 52.

Figure 3A:
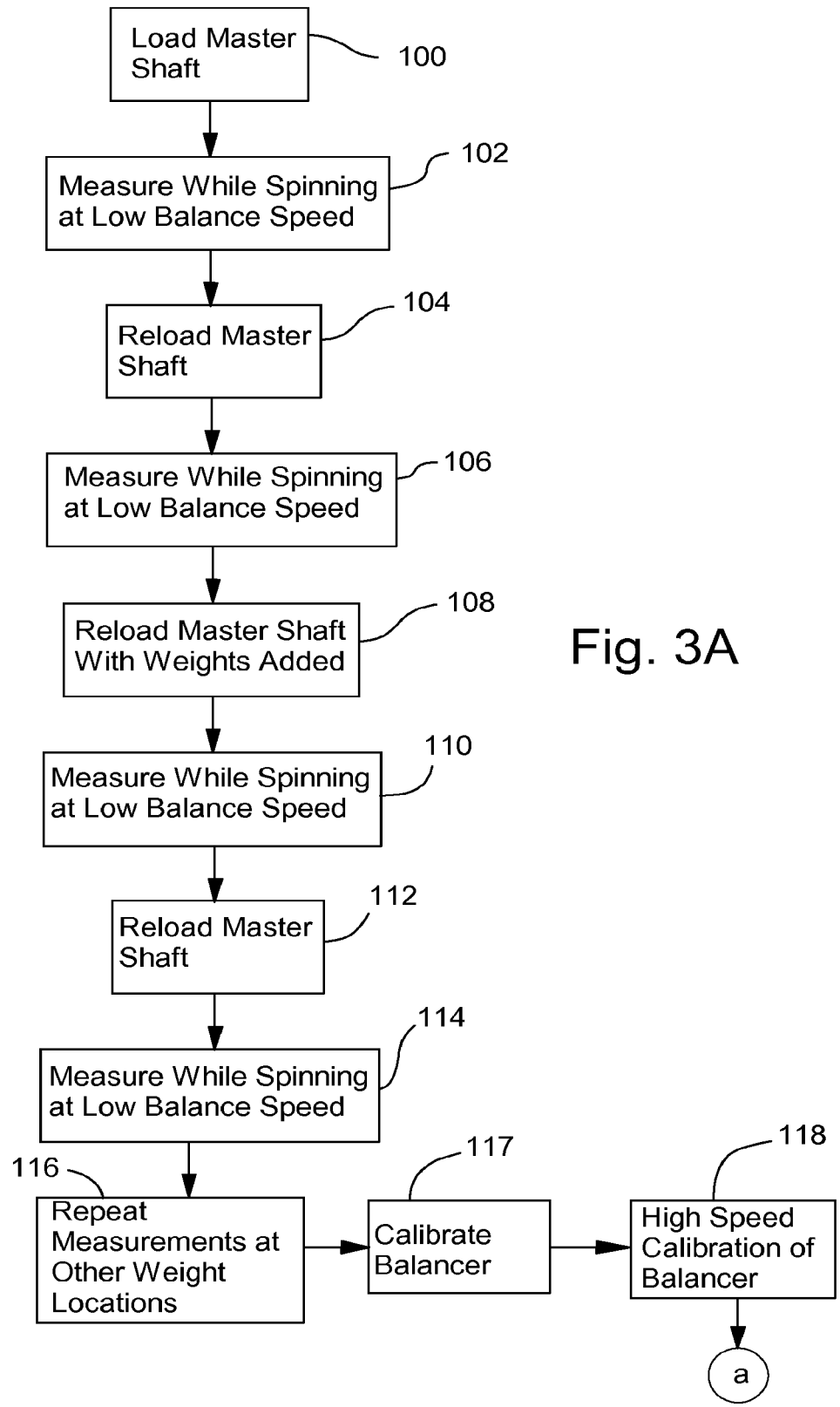
FIGS. 3A and 3B are a flow chart of the shaft balancing process.
Figure 3B:
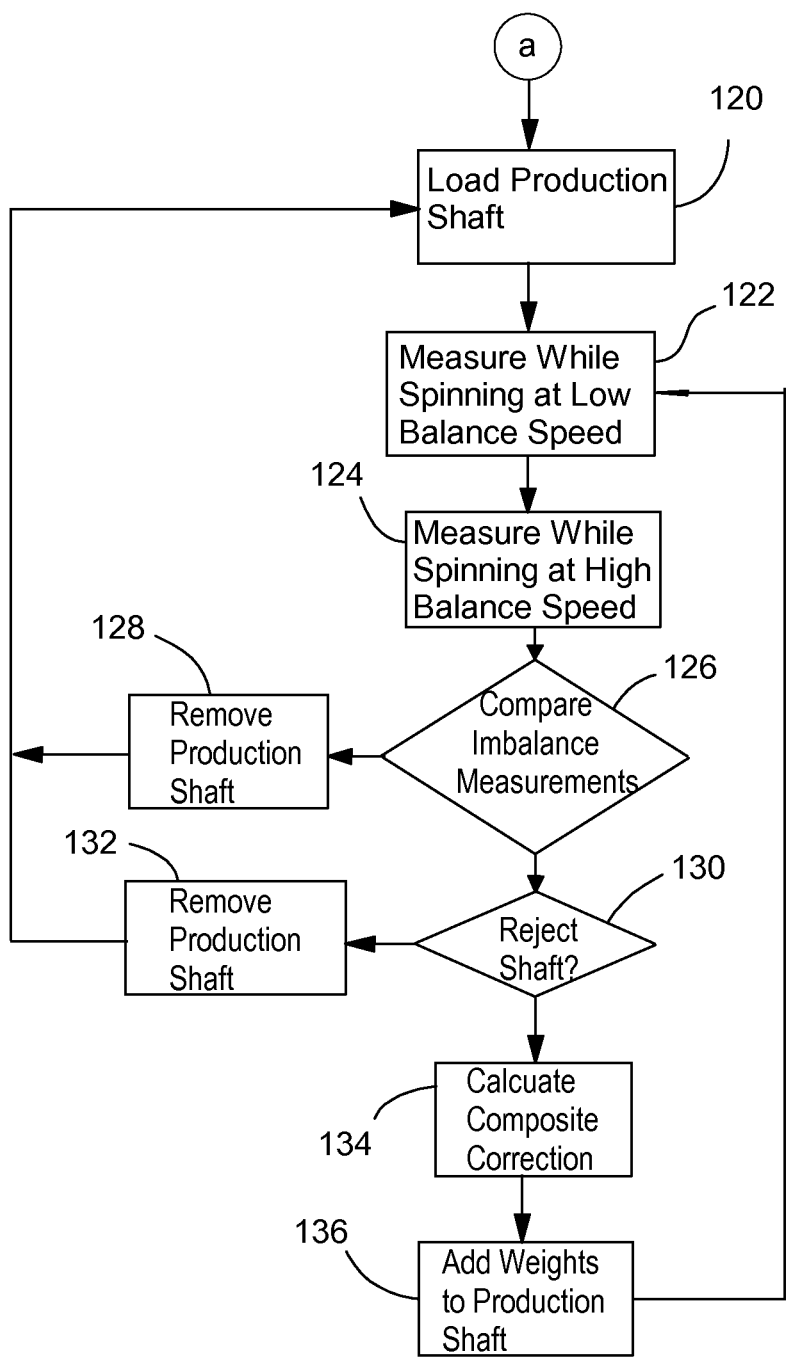

FIGS. 3A and 3B illustrate a process for dynamically balancing a shaft on a balancer such as that shown in FIG. 1, for multiple rotational speed operation of the shaft. From time to time, the balancer is calibrated to make sure the balancer is taking correct measurements when balancing production shafts. This may be needed to minimize variation that occurs due to, for example, temperature, vibration, chucking/unchucking of previous shafts or other factors that reduce the accuracy of the balancer measurements. This calibration may occur, for example, at the beginning of every shift in a factory or at the beginning of every new batch of production shafts that will be tested.

In block 100 a master shaft is loaded into the balancer to start the calibration process. The master shaft is a shaft known to have very low residual imbalance, which allows the balancer to be calibrated accurately. Employing a master shaft, in general, is known in the art and so the specifics of the master shaft itself will not be disclosed in more detail herein. The balancer is activated to spin the master shaft at a predetermined low balance speed, block 102. This low balance speed may be the low rotational speed at which the actual production shafts are tested. While rotating at this rotational speed, the low speed dynamic imbalance measurements from the sensors are recorded by the controller. The master shaft is then re-loaded into the balancer at a 180 degree rotation (about its longitudinal axis) from the original orientation it was loaded, block 104. The balancer is activated to spin the master shaft at the low balance speed while low speed dynamic imbalance measurements from the sensors are recorded by the controller, block 106.

When referring to angles and angles of rotation herein, this refers to angles of rotation (position) of the shaft about a longitudinal axis extending longitudinally through the center of the particular shaft. This type of reference to angles relative to the shaft is known to those skilled in the art and will not be discussed in more detail herein.

The master shaft is then re-loaded into the balancer at zero degree rotation from the original orientation with a first set of known correction weights added at one of the weight correction locations (such as one of the locations shown in FIG. 2), block 108. The balancer is activated to spin the master shaft with the first set of weights at the low balance speed while low speed dynamic imbalance measurements from the sensors are recorded by the controller, block 110. The master shaft with the first set of weights is then re-loaded into the balancer at the 180 degree rotation from the original orientation, block 112. The balancer is activated to spin the master shaft with the first set of weights at the low balance speed while low speed dynamic imbalance measurements from the sensors are recorded by the controller, block 114.

The process steps in blocks 108-114 are repeated with weights sequentially added at other weight correction locations on the master shaft, block 116. At this point in the process conventional shaft calibration software is applied to all of the imbalance measurements to calibrate the balancer to assure accurate balance shaft measurements when testing production shafts at the low balance speed, block 117. Shaft calibration software is well known to those skilled in the art and so will not be discussed further herein.

The calibration procedure then may proceed by repeating the steps of blocks 100-117, but at a predetermined high balance speed, block 118. This high balance speed may be the high rotational speed at which the actual production shafts are tested. The balancer holds the calibrations for both low and high balance speeds in memory for future use when testing production shafts. The calibrations allow for corrections in the accuracy of the readings taken from the balancer while testing production shafts. Production shafts are those that will be used on products, such as, for example, vehicles in the case of a production drive shaft being tested.

The procedure now continues for testing production shafts. One of the production shafts is loaded onto the balancer, block 120. The balancer spins the production shaft at the low balance speed and measures imbalance detected by the sensors, block 122. The imbalance measurement at each sensor location may be, for example, imbalance magnitude in units of gram-centimeters and angular direction about the longitudinal axis of the shaft in degrees. The balancer then accelerates the shaft to the high balance speed and measures imbalance detected by the sensors, block 124.

The low speed imbalance sensor measurements are compared to the low speed balance specifications and the high speed imbalance sensor measurements are compared to the high speed balance specifications, block 126. The balance specifications may be defined in terms of imbalance force and direction at each sensor location. To meet the specifications, the measured imbalance at each location must be less than its corresponding specification. The imbalance magnitude may be in units, such as, for example, gram-centimeters and the angular direction in degrees. Also, the balance specifications for the two speeds do not have to be the same.

If drive shaft meets balance specifications at each location on the shaft for both low balance speed and for high balance speed, the balancing of the shaft is completed and the production shaft is removed from the balancer, ready for use, block 128. The process then starts again at block 120 with the next production shaft to be tested.

If balancing has already been tried a predetermined number of times, and the shaft still does not meet the balance specifications for both low balance speed and high balance speed, then the drive shaft is rejected, block 130. The drive shaft is removed from the balancer, block 132, and the process returns to block 120 to begin testing the next production shaft. The removed shaft may then be repaired or discarded as defective. The maximum number of times to test and balance the shaft may be, for example, four. Also, a maximum amount of correction weight may be specified at each location, with the production shaft rejected if the correction weight is too high at any location. Typically, if the balancing cannot be achieved within four tries or the correction weight is too high at one or more locations, there is probably something incorrect with the initial fabrication or assembly of the shaft that will not be corrected merely by adding balancing weights.

If the production shaft does not meet balance specifications at each location on the shaft for both low and high balance speed and if the balancing has been tried less than the predetermined number of times, the required composite correction at each weight location on the shaft is calculated based on the measurements taken at both the low and high balance speeds, block 134. The composite correction is not a correction based on measurements taken at only a single rotational speed as this may not achieved the desired result of minimizing the imbalances for at least two rotational speeds. The composite correction may be calculated by the controller, for example, by vector addition of the two imbalance measurements (low speed and high speed) taken at each location divided by two—what might by considered as an average imbalance measurement at each location. This may be referred to as a vectoral composite correction at each sensor location. At each location where the force and direction of imbalance is measured at both rotational speeds, the force and direction for both speeds are added using vector addition and divided by two.

For example, at a particular sensor location on the shaft, the balancer may measure fifty gram-centimeters (g-cm) imbalance at seventy degrees at a low rotational speed of 1000 revolutions per minute (RPM) and measure sixty g-cm at one hundred thirty five degrees at a high rotational speed of 4000 RPM. One may divide the two imbalance measurements into their orthogonal components of +17 g-cm and +47 g-cm for the low speed and −42 g-cm and +42 g-cm at the high speed. Vector summing of the imbalances is −25 g-cm and +89 g-cm at 106 degrees. The average imbalance measurement (rounding off) is then −13 g-cm and +45 g-cm, which is 47 g-cm at 106 degrees (the vectoral composite correction).

Then, based on the vectoral composite corrections for each location, the controller uses the resulting force and angle at each measurement location to determine the amount and angle of weights to be added to the shaft at the weight locations. The determination of the amount of weight and angle of placement for the weight (once the vectoral composite corrections have been determined) may be conventional and so will not be discussed in further detail.

The vectoral composite correction discussed above weights the importance of balancing the shaft at both the low and high rotational speeds equally. However, there may be instances where the balance at one of the rotational speeds is more important. In such a case, a weight factor may be added to the imbalance measurements at one of the rotational speeds so that the average imbalance measurement calculated for each location is weighted more toward a particular one of the rotational speeds, if so desired. Also, other mathematical relationships to produce a best fit dynamic imbalance calculation for the two speeds may be employed instead, if so desired.

The calculated amount and angle of weights are now added to the shaft at the weight locations, block 136. The weights may be sets of various sizes or may be a rolled strip that can be cut to the length needed for the amount of correction weight. The weights can be added by a machine operator or may be added by an automated process. The weights may be welded in place or affixed by another suitable means. The addition of balance weights to a shaft is known to those skilled in the art and so will not be discussed further. After adding the weights, the process then returns to block 122 to repeat the measuring and balancing steps.

As an alternative, the shafts may be balanced at more that two rotational speeds. In such a case, say, for example, three rotational speeds, then the master shaft balancing and the production shaft balancing are all conducted at the three speeds. A composite correction may then be applied to determine the amount and angle for each weight added to the shaft to overall optimize the balancing of the shaft for the three rotational speeds.

The dynamic balancing of the shaft iteratively calculates and applies composite corrections for two or more rotational speeds to optimally minimize dynamic shaft imbalance at the particular rotational speeds where shaft balancing is most desired. For example, such a process may be used with a vehicle drive shaft to minimize passenger compartment noise at one shaft rotational speed while also improving shaft reliability at a second shaft rotational speed. Such rotational speeds may be, for example, 1,000 revolutions per minute and 3,500 revolutions per minute, with the imbalance at both speeds slightly higher than if the shaft is balanced for that particular speed only, but within desired imbalance limits at both speeds.

While certain embodiments of the present invention have been described in detail, those familiar with the art to which this invention relates will recognize various alternative designs and embodiments for practicing the invention as defined by the following claims.

What is claimed is:

1. A method of dynamically balancing a shaft for multiple rotational speeds, the method comprising the steps of:
    (a) loading the shaft into a balancer;
    (b) rotating the shaft in the balancer at a predetermined first rotational speed while measuring, with a sensor, a first force and a first angle of a first shaft imbalance measurement;
    (c) rotating the shaft in the balancer at a predetermined second rotational speed, different from the first rotational speed, while measuring, with the sensor, a second force and a second angle of a second shaft imbalance measurement;
    (d) comparing the first shaft imbalance measurement to a first predetermined imbalance specification and comparing the second shaft imbalance measurement to a second predetermined imbalance specification;
    (e) if the first shaft imbalance does not meet the first predetermined imbalance specification or the second shaft imbalance does not meet the second predetermined imbalance specification, then calculating a composite correction based on the first and second shaft imbalance measurements; and
    (f) applying a first amount of weight to the shaft at a first correction angle based on the calculated composite correction.

2. The method of claim 1 wherein step (e) is further defined by the composite correction being a vectoral composite correction wherein the first shaft imbalance and the second shaft imbalance are added using vector addition and divided by two, and step (f) is further defined by the first amount of weight added to the shaft at the first correction angle being based on the vectoral composite correction.

3. The method of claim 2 wherein:
    step (b) is further defined by measuring, with a second sensor, a third force and a third angle of a third shaft imbalance measurement while rotating the shaft at the first rotational speed, with the second sensor spaced from the sensor;
    step (c) is further defined by measuring, with the second sensor, a fourth force and a fourth angle of a fourth shaft imbalance measurement while rotating the shaft at the second rotational speed;
    step (d) is further defined by comparing the third shaft imbalance measurement to a third predetermined imbalance specification and comparing the fourth shaft imbalance measurement to a fourth predetermined imbalance specification;
    step (e) is further defined by, if the first shaft imbalance does not meet the first predetermined imbalance specification, the second shaft imbalance does not meet the second predetermined imbalance specification, the third shaft imbalance does not meet the third predetermined imbalance specification or the fourth shaft imbalance does not meet the fourth predetermined imbalance specification, then calculating the vectoral composite correction based on the first and second shaft imbalance measurements and a second vectoral composite correction based on the third and fourth shaft imbalance measurements; and
    step (f) is further defined by applying the first amount of weight to a first weight location on the shaft at the first correction angle based on the calculated vectoral composite correction, and applying a second amount of weight to a second weight location on the shaft at a second correction angle based on the calculated second vectoral composite correction.

4. The method of claim 1 wherein:
    step (b) is further defined by measuring, with a second sensor, a third force and a third angle of a third shaft imbalance measurement while rotating the shaft at the first rotational speed, with the second sensor spaced from the sensor;
    step (c) is further defined by measuring, with the second sensor, a fourth force and a fourth angle of a fourth shaft imbalance measurement while rotating the shaft at the second rotational speed;

step (d) is further defined by comparing the third shaft imbalance measurement to a third predetermined imbalance specification and comparing the fourth shaft imbalance measurement to a fourth predetermined imbalance specification;

step (e) is further defined by, if the first shaft imbalance does not meet the first predetermined imbalance specification, the second shaft imbalance does not meet the second predetermined imbalance specification, the third shaft imbalance does not meet the third predetermined imbalance specification or the fourth shaft imbalance does not meet the fourth predetermined imbalance specification, then calculating the composite correction based on the first and second shaft imbalance measurements and a second composite correction based on the third and fourth shaft imbalance measurements; and step (f) is further defined by applying the first amount of weight to a first weight location on the shaft at the first correction angle based on the calculated composite correction, and applying a second amount of weight to a second weight location on the shaft at a second correction angle based on the calculated second composite correction.

5. The method of claim 4 wherein step (e) is further defined by, if the first shaft imbalance does not meet the first predetermined imbalance specification more than a predetermined number of times, the second shaft imbalance does not meet the second predetermined imbalance specification more than a predetermined number of times, the third shaft imbalance does not meet the third predetermined imbalance specification more than a predetermined number of times or the fourth shaft imbalance does not meet the fourth predetermined imbalance specification more than a predetermined number of times, then the shaft is rejected as defective.

6. The method of claim 1 wherein, before step (a), the method comprises:

(g) mounting a master shaft in the balancer;

(h) employing the master shaft to calibrate the balancer for the first rotational speed;

(i) employing the master shaft to calibrate the balancer for the second rotational speed; and (j) storing the calibrations in a memory of a controller to employ during steps (b) and (c).

7. The method of claim 1 wherein, after step (f), repeating steps (b) through (f), if the first shaft imbalance does not meet the first predetermined imbalance specification or the second shaft imbalance does not meet the second predetermined imbalance specification for the immediately previous imbalance measurements.

8. A method of dynamically balancing a shaft for multiple rotational speeds, the method comprising the steps of:

(a) loading the shaft into a balancer;

(b) rotating the shaft in the balancer at a predetermined first rotational speed while measuring, with a sensor, a first force and a first angle of a first shaft imbalance measurement;

(c) rotating the shaft in the balancer at a predetermined second rotational speed, different from the first rotational speed, while measuring, with the sensor, a second force and a second angle of a second shaft imbalance measurement;

(d) comparing the first shaft imbalance measurement to a first predetermined imbalance specification and comparing the second shaft imbalance measurement to a second predetermined imbalance specification;

(e) if the first shaft imbalance does not meet the first predetermined imbalance specification or the second shaft imbalance does not meet the second predetermined imbalance specification, then calculating a vectoral composite correction based on the first and second shaft imbalance measurements; and (f) applying a first amount of weight to the shaft at a first correction angle based on the calculated vectoral composite correction.

9. The method of claim 8 wherein the vectoral composite correction is vector addition of the first shaft imbalance and the second shaft imbalance divided by two.

10. The method of claim 8 wherein, after step (f), repeating steps (b) through (f), if the first shaft imbalance does not meet the first predetermined imbalance specification or the second shaft imbalance does not meet the second predetermined imbalance specification for the immediately previous imbalance measurements.

11. The method of claim 10 wherein step (e) is further defined by, if the first shaft imbalance does not meet the first predetermined imbalance specification more than a predetermined number of times or the second shaft imbalance does not meet the second predetermined imbalance specification more than a predetermined number of times then the shaft is rejected as defective.

12. The method of claim 8 wherein, before step (a), the method comprises:

(g) mounting a master shaft in the balancer;

(h) employing the master shaft to calibrate the balancer for the first rotational speed;

(i) employing the master shaft to calibrate the balancer for the second rotational speed; and (j) storing the calibrations in a memory of a controller to employ during steps (b) and (c).

* * * * *